United States Patent
Paczkowski et al.

(10) Patent No.: US 12,107,868 B1
(45) Date of Patent: Oct. 1, 2024

(54) LEDGER-BASED PROTOCOL TO VERIFY SOURCES AND TRANSMIT COMMUNICATIONS

(71) Applicant: T-Mobile Innovations LLC, Overland Park, KS (US)

(72) Inventors: Lyle Walter Paczkowski, Mission Hills, KS (US); William M. Parsel, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 301 days.

(21) Appl. No.: 17/365,696

(22) Filed: Jul. 1, 2021

(51) Int. Cl.
| | |
|---|---|
| *G06F 21/64* | (2013.01) |
| *G06F 21/16* | (2013.01) |
| *H04L 9/32* | (2006.01) |
| *H04L 9/40* | (2022.01) |
| *G06F 21/45* | (2013.01) |
| *G06F 21/60* | (2013.01) |
| *H04L 9/00* | (2022.01) |
| *H04W 4/14* | (2009.01) |

(52) U.S. Cl.
CPC .......... *H04L 63/126* (2013.01); *H04L 9/3247* (2013.01); *H04L 63/0876* (2013.01); *H04L 63/10* (2013.01); *H04L 9/50* (2022.05); *H04L 2463/082* (2013.01); *H04L 2463/121* (2013.01); *H04W 4/14* (2013.01)

(58) Field of Classification Search
None
See application file for complete search history.

(56) References Cited

U.S. PATENT DOCUMENTS

| | | | | |
|---|---|---|---|---|
| 2018/0183587 | A1* | 6/2018 | Won | H04W 4/70 |
| 2019/0165949 | A1* | 5/2019 | Ramos | H04L 9/3239 |
| 2019/0372834 | A1* | 12/2019 | Patil | H04L 9/3263 |
| 2019/0386990 | A1* | 12/2019 | Liu | H04L 63/0876 |
| 2021/0019429 | A1* | 1/2021 | Cooner | G01J 1/4204 |
| 2021/0176039 | A1* | 6/2021 | Fang | G06F 21/64 |
| 2021/0342855 | A1* | 11/2021 | Kochura | G06Q 10/10 |

OTHER PUBLICATIONS

Bridging RTL and Gate: Correlating Different Levels of Abstraction for Design Debugging. Cheung. IEEE. (Year: 2007).*
SoC Security Verification using Property Checking. Farzana. IEEE. (Year: 2019).*

* cited by examiner

*Primary Examiner* — Venkat Perungavoor
(74) *Attorney, Agent, or Firm* — Shook, Hardy & Bacon L.L.P.

(57) ABSTRACT

Methods and systems are provided for identifying the true identity of senders of messages, for example based on hardware identifiers and other information, such as timestamps and/or register-transfer level licenses. In some cases, a hyper ledger provides a protocol for combining information such as hardware identifiers (for example silicon identification information) with other information and logic instructions to generate ledger identifications. Embodiments can be used to authorize transmission of messages, such as SMS or RCS messages, and to provide an archive or message information. In some cases, messages from certain domains can be aggregated for routing.

8 Claims, 5 Drawing Sheets

LEDGER-BASED PROTOCOL TO VERIFY SOURCES AND TRANSMIT COMMUNICATIONS

SUMMARY

In systems with one or more networks, such as cellular networks using 5G technology, devices may communicate, in some cases with other devices. Devices may communicate using, for example, Short Message Service (SMS) or Rich Communication Suite (RCS) messages. Devices can include high-science appliances, autonomous vehicles, network routers, or other user devices, which may automatically attempt to send messages to other devices. Such messages can provide services relating to businesses and entertainment, such as content deliver. In some cases, messages can contain critical communications between devices, such as between vehicles. Messages, such as SMS messages sent by devices, are not tested for validity or veracity, or trusted ownership, in conventional technologies.

In conventional technologies, no central or core network aspect processes such communications. Messages can be handled by tertiary systems or can bypass carriers, which can cause security concerns. For example, no systems exist to attest to whether the hardware device source of the message is true or legitimate. The trustworthiness of messages cannot be determined, even though messages can include commands originating from devices, such as Internet of Things (IoT) devices. As new technologies allow multiple subscriber identity module (SIM) identities, security for SMS and other messages is required to determine the true sources of messages. In some cases, as devices like appliances communicate with each other, a chain of custody relating to messages could become extended. As SMS protocols may begin to be used automatically between devices, systems need to ensure legitimate sources of messages. Conventional networks cannot ensure the origin and information of SMS communications or other messages, for example, including whether a hardware or silicon source is true. A true identity of data paths is needed for overall security relating to communications. Additionally, no central or standardized record of the messages exists. Network systems are not able to capture, store, and/or archive SMS communications or other messages.

Embodiments herein provide improved technologies for sending and/or archiving messages, including a new type of message for IoT devices. Systems described herein can verify the origins of communications, such as SMS or RCS messages, for example. In some cases, a source of an SMS or other communication is ensured using a blockchain. For example, one or more identifiers of hardware and/or software elements can be used to reliably identify devices. In some cases, a register-transfer level (RTL) license and logic instructions can be combined with silicon identification information to determine the true sources of messages. In some cases, an archive of SMS or other communications is maintained in a hyper ledger data share, which can capture and be used to confirm or audit the identities of devices. This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The following acronyms may be used in the present disclosure and are provided here for reference.

| | |
|---|---|
| AMF | Access and Mobility Management Function |
| AUSF | Authentication Server Function |
| IMS | IP Multimedia Subsystem |
| MMS | Multimedia Messaging Service |
| MTC | Machine-Type Communications |
| NEF | Network Exposure Function |
| NFV | Network Functions Virtualization |
| PCF | Policy Control Function |
| RCS | Rich Communications Suite |
| RTL | Register-Transfer Level |
| SMS | Short Message Service |
| SMF | Session Management Function |
| SMSF | Short Message Service Function |
| UDM | Unified Data Management |
| UE | User Equipment |
| VNF | Virtualized Network Functions |

In embodiments according to the present disclosure, a hyper ledger can be used to combine information, including hardware-identification information, to verify the sources of messages. For example, a hardware device can be associated with a specific identifier. The hardware device can request or attempt to send a message to another device. In embodiments, the message can include information such as a timestamp. A blockchain can be created that contains the specific identifier and the timestamp. The system can verify the information, for example by determining the timestamp is associated with a time when the message was attempted or requested to be sent.

In embodiments, the system determines whether a source of a communication, such as an SMS message, can be trusted, using a blockchain or a ledger identification, as discussed with respect to FIG. 3, below. For example, a block may only be added to a blockchain if the information is consistent with either the earlier blockchain information or other data sources. For example, a successful new block on a blockchain, or a match based on a comparison with a ledger identification, can prove the source of a message is to be trusted and can maintain a tag or tattoo in the new block. In some cases, a comparison or analysis of identifier(s) and/or time data associated with a communication is used to prove the source of a communication to a system. As an example, if the information regarding a new message to be sent, corresponding to a new block in a blockchain, is truthful, then the new block can be deposited quickly by a system because the predicates of truthfulness are present in the chain. When a verification occurs, the system can automatically send the message to the other device. Although the terms SMS and/or RCS may be used in this description, it should be understood that other types of messages can be used, in embodiments, such as MMS or iMessage messages, for example, or any type of binary or other message used in between or by machines.

In one exemplary scenario, messaging services can include gateway-to-mobile, or Mobile-Terminated (MT) services. In some cases, machines such as IoT devices will make significant leaps in efficiency by intelligently choosing the most effective data-transfer channel for a situation. For example, devices can send SMS status updates back to a control center, or IoT smart meters or other devices can transfer data to other devices. Messaging services can be suited for these uses because messaging services such as SMS messages may be widely available. For instance, using a cloud communications platform, entities can embed messages (such as SMS messages) when deploying devices (such as IoT devices). In some cases, messages such as SMS messages can provide a near-seamless channel or connection between back-end servers and devices in the field, or deployed or user devices. In the context of consumer applications, messages such as SMS messages can be used as an interface between users and their devices, such as IoT devices. A messaging gateway such as an SMS gateway can allow computing devices to send and receive message transmissions to and from a telecommunications network. In some cases, messages are eventually routed into networks such as cellular networks. In some examples, messaging gateways can support the conversion of communications from types such as emails or other formats into messaging formats.

In another exemplary scenario, entities such as Intel Corporation have initiated aspects of hardware assurance relating to supply chains, to assist with transparent supply chains. Concerns exists regarding counterfeit hardware devices or parts, which may cause safety hazards or failures of critical applications. Intel Corporation has addressed hardware supply chain assurance using a set of tools, policies, and procedures relating to a "Transparent Supply Chain." These can be implemented at manufacturing facilities, for example, by manufacturers of computing devices such as personal computers and servers. This practice can enable other entities to verify the authenticity and versions of computing systems and their components. In some cases, the information to be used is stored in a blockchain data share, referred to as Quorum. In this scenario, practices include beginning with trusting a source, but have limitations. For example, this scenario is not sufficient for products with multiple subsystems, or may be limited to screening for counterfeit components only. For example, this scenario may only be able to address trust in a component at an initial point, but not in the context of products requesting to send messages to other devices.

In another scenario, the flow of signals between hardware registers can be described, but this scenario does not consider or record information at the transistor level or the logic gate level, for example. In the context of digital circuit design, the flow of digital signals between hardware registers, and the logical operations performed on the signals, can be modeled by a register-transfer level (RTL) abstraction. RTL abstraction can be used in hardware description languages (HDLs) to generate high-level representations of a circuit, for example, which can be used in some cases to derive lower-level representations or actual wiring. In HDLs, a designer may declare certain registers (which may correspond to variables in computer programming languages). A designer may also describe certain logic using constructs from programming languages (e.g., if-then and arithmetic operations). In this example, the designer can operate at the level of RTL, describing a flow between registers, but the transistor level or logic gate level information is not recorded or determined.

According to aspects of the present disclosure, improved technologies are provided to establish the source of messages in order to approve or allow the transmission of messages. For example, aspects can insure the provenance of systems, such as critical IoT systems or other systems involving devices. For instance, systems can automatically detect a combination of a message origination system (e.g., for SMS messages), register-transfer information, and supply-chain information (e.g., serial numbers). This can provide an attested system, to determine the true sources of messages. Knowing the true source of messages can be particularly necessary with respect to critical IoT devices or autonomous devices, for example.

In embodiments, a new type of configurations for Virtual Network Function (VNF) or Network Functions Virtualization (NFV) is created in an IoT core or platform, which enables bilateral short code messages to or from IoT devices. These messages can be in the form of SMS messages or other messages, along with additional information, in some embodiments. For example, the messages can include timestamp information and/or hardware information, as described herein. In some cases, messages can be cryptographically signed, which can prevent messages from being intercepted and/or interrogated within a network. For example, a message can be an SMS message that includes a timestamp and an identification of hardware or a confirmation from a Hardware Root of Trust, which is digitally signed for verification purposes. In some cases, the new type of VNF/NFV network "slice" configuration is used for any or each type of slice, such as mobile broadband, machine-type communications, and/or ultra-reliable low latency types.

In some embodiments, an improved smart or microcontract can be used in a block in a hyper ledger, for example, to satisfy a two-factor authentication challenge using trusted machine answers. In some cases, systems can automatically use a hyper ledger to respond to or fulfill authentication hurdles, to provide messages from trusted sources without requiring human responses to two-factor authentication challenges. Systems can establish end-to-end security that affects or runs on the devices that both send and receive messages, such as SMS messages, where messages can be transmitted in encrypted form. In some cases, key rotation can be used, which can prevent decryption of the messages, even if one of the devices becomes compromised. For example, some messages may be required by law to be stored by or at a network operator, and these messages can remain encrypted even if one device (such as the sending or the receiving device) cannot be trusted.

According to some aspects, systems can provide one or more reverse notifications relating to messages, including message attempts. For example, messages can fail between domains at a relatively high rate, with no notification to the sender (or the receiver) that a command code has failed. In embodiments, a reverse notification system provides a notification to the sender and/or the intended recipient of a failure to deliver a message, such as a command code. As stated above, certain messages can be commands to or from critical IoT devices, or autonomous machines or appliances, where a notification of a failed message can be crucial to the operation of systems or devices. As one example, smart appliances within a home may be attempting to coordinate functions or schedules, or autonomous vehicles on the road may be attempting to communicate their locations or speeds to each other.

Additionally, embodiments can provide improvements to message aggregation. For example, an improved form or route aggregation for messages can be enabled, which assembles and/or prioritizes messages from an IoT device domain. In some cases, these messages can be forwarded to a point, such as an appropriate rally point, to prioritize the messages. As described herein, messages from devices, such as IoT or autonomous devices, for example, can be critical. These technologies can be improved with route aggregation. Further, route aggregation can reduce the required number or capacity of routers, which can reduce the resources needed. The amount of updates required, for example due to network changes, can also be reduced due to route aggregation reducing the routing resources required. In embodiments, aggregation reduces the demand on systems by lowering the workload required, which reduces the amount of power, memory or storage, and/or bandwidth needed by the system.

In embodiments, RTL license information can be used with logic information and hardware identification to complete a request to send a message to a device. In some cases, one or more micro-contract protocols can be contained in a block of a blockchain, for example as executable code. A micro-contract protocol can trigger an SMS short code, or other code or transmission, based on certain if/then parameters being satisfied. Embodiments can measure or determine conditions, and transmit or send messages when transmission conditions are satisfactory for delivery of the code. In some cases, a micro-contract can be code in a blockchain that executes, automatically, some or all aspects of an agreement.

Figure 1:
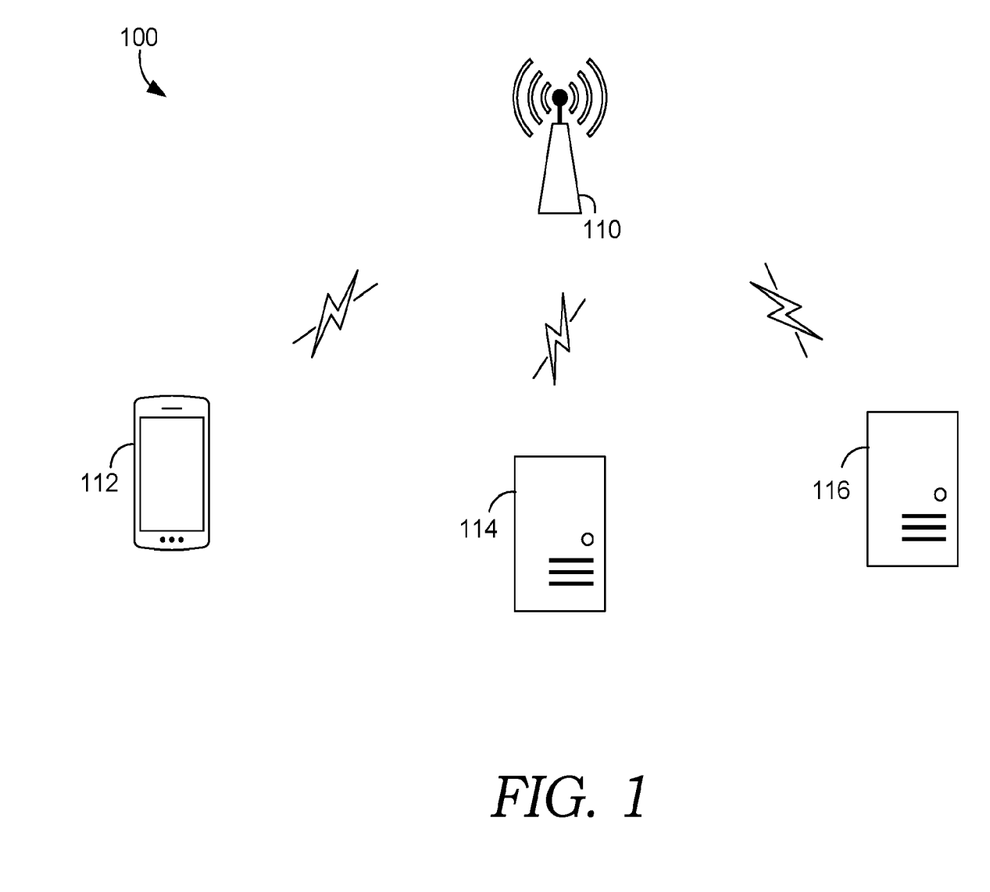
FIG. 1 depicts an exemplary environment suitable for use in implementations of the present disclosure.
Figure 2:
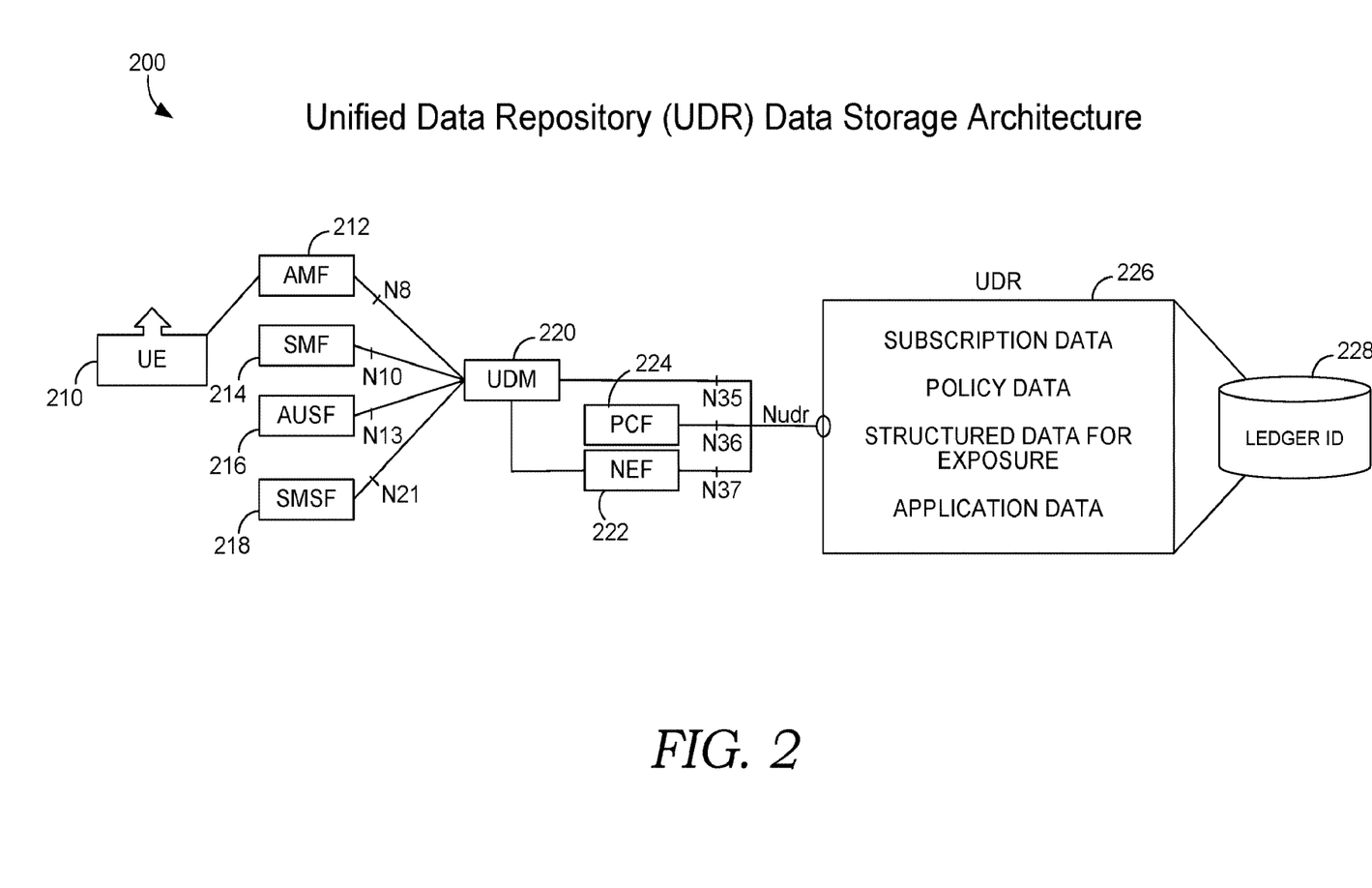
FIG. 2 depicts an exemplary system suitable for use in accordance with embodiments of the present disclosure.

Turning to FIG. 1, an exemplary environment 100 is shown, which is suitable for use in implementations of the present disclosure. FIG. 1 includes an illustrative network source 110, which can be any network-providing component or aspect, in embodiments. For example, a network source 110 can be a tower or cell associated with a network, such as a 5G network. Device 112 in FIG. 1 can be any type of device, such as a wireless or mobile device, or an appliance or machine, such as an IoT device. In embodiments, device 112 can be user equipment (UE) 210, as shown in FIG. 2. The exemplary environment 100 in FIG. 1 is merely an illustration, and any number of network sources (e.g., network source 110) and any number of devices (e.g., device 112) can be used, in embodiments.

A first machine 114 is also shown in FIG. 1. The first machine 114 can be an IoT device or another type of machine or appliance. For example, first machine 114 can be a high-science appliance. In some cases, first machine 114 is a smart home appliance or a server device, such as another network server system, for example. First machine 114 and/or second machine 116 can correspond to UE 210 in FIG. 2, in embodiments. In some cases, first machine 114 and second machine 116 can communicate with each other using a network.

First and second machines 114, 116 can be wireless or wireline devices, and they can communicate with other devices using other networks or network components besides the illustrative aspects shown in FIG. 1. For example, first machine 114 can send or receive messages to or from a command center computing device, or to or from a user mobile device, such as device 112. For instance, first machine 114 could send a command to second machine 116 to begin a process once first machine 114 has completed a process. In this example, a first machine 114 could receive commands to stagger water or electricity use with other machines. Thus first machine 114 could receive a command message to perform a wash cycle from a server. Upon completion of the cycle, the first machine 114 could command the second machine 116 to begin its own water-based function, using a machine-to-machine message. Because machine-sent messages can include commands and can be sent to other machines, the source of such messages must be trusted or recorded.

Turning to FIG. 2, an exemplary system 200 is shown, suitable for use in accordance with embodiments of the present disclosure. FIG. 2 illustrates user equipment (UE) 210, which can be a device 112 or another machine, such as first machine 114. In this example, UE 210 can attempt to send a message using a network. As shown in FIG. 2, the request or attempt to send a message from UE 210 can be received by a system, for example by an Access and Mobility Management Function (AMF) 212 aspect of the exemplary system 200. An AMF 212 can be the first aspect in a 5G network, for example, that is communicated with by a UE 210 such as a mobile handset. Data or information from AFM 212, Session Management Function (SMF) 214, Authentication Server Function (AUSF) 216, and Short Message Service Function (SMSF) 218 can be considered or used by a Unified Data Management (UDM) 220 aspect, as illustrated in FIG. 2. For example, an AUSF can be used to authenticate a user, for example using account or billing information. An SMSF 218 can be an aspect of a network, such as a 5G network, to address legacy SMS messages.

A UDM 220 can be, in embodiments, a large database of users, for example all subscribers, which may be replicated frequently. As shown, a UDM 220 can interface or interact with a Network Exposure Function (NEF) 222 and/or Policy Control Function (PCF) 224. For example, a PCF 224 can determine or provide different policies, such as rules, that are assigned to various IoT devices. In some cases, codes or index values can be part of policy controls or rules, which could determine a level or access or quality. As one example, vehicles could be provided with a relatively higher (or the highest) level of quality of service or access at any time on a network, while voice applications can be granted less access. In embodiments, an NEF 222 comprises a repository of Application Programming Interfaces (APIs).

To give an example, an application can arrive at an AMF 212, be found to be satisfied by an SMF 214, and can them be sent or pushed to a UDM 220. At this point, an NEF 222 can determine or instruct what the network is allowed to do, such as exposing network access in a particular fashion. As shown in FIG. 2, a Unified Data Repository (UDR) 226 can receive data. As shown, in embodiments, UDR 226 receives and can direct or handle storage of data, including subscription data and/or policy data. UDR 226 can also include structured data for exposure, such as specific access or permissions associated with a UE 210 message or message attempt, and/or application data. The data shown at UDR 226 in FIG. 2 can relate to the UE 210 and a request to send a message, for example a UE 210 that is an appliance seeking to communicate in binary with another appliance.

UDR 226 is in communication with a ledger 228. Ledger 228 can attach to UDR 226. Ledger 228 can include ledger identities, as shown in FIG. 2. Ledger identities in ledger 228 can be based on some or all of the elements described herein, in order to capture and document perfected identities from devices. For example, ledger 228 can store and share trusted identities of devices (e.g., device 112 or first machine 114) sending messages, such as IoT appliances, network routers, or server systems from other networks, for example. In embodiments, the messages themselves, such as SMS or other messages, contain a combination of information used to determine the true source of each message. Each message can include a tattoo, which can be based on an identifier and/or a timestamp, for example, and can be used by a system to determine the true source of the message.

In embodiments, blockchain technology is configured to be used to allow messages to reach recipient devices, after determining the true sources of messages. A new ledger 228, as shown in FIG. 2, can be used in a network environment to address trustworthiness of messages, such as SMS messages using a 5G network. The ledger 228 component in a network provides an archive of identifications or unique serial numbers with messages, for example. Because 5G network environments can accept APIs in the core, the additional database shown as ledger 228 can be created to assemble components relating to messages from devices.

Figure 3:
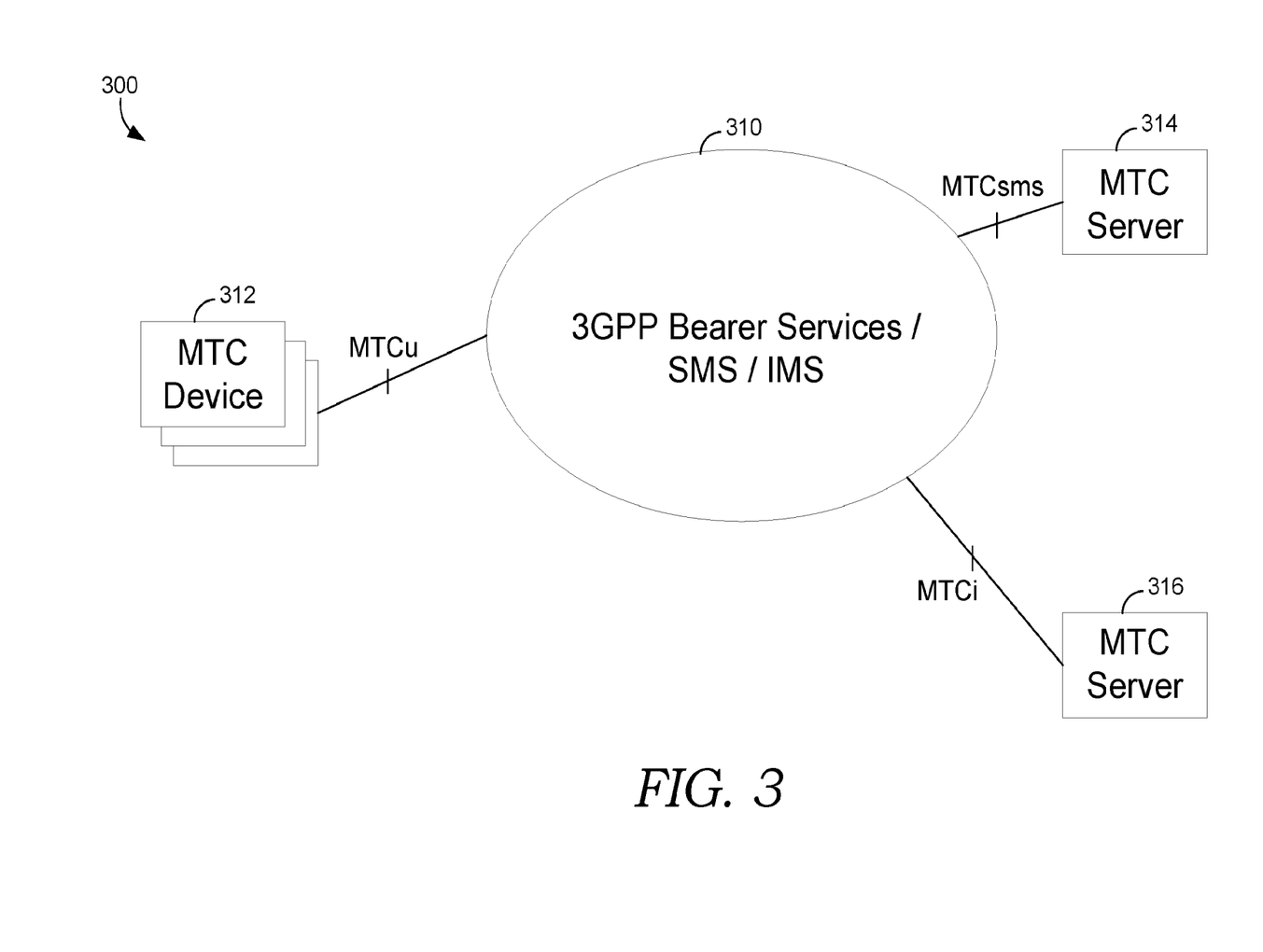
FIG. 3 an exemplary architecture suitable for use in accordance with embodiments of the present disclosure.

Turning now to FIG. 3, an illustrative architecture 300 is shown, which can be suitable for use in accordance with embodiments. The architecture 300 in FIG. 3 is based on a machine-to-machine architecture in a 3rd Generation Partnership Project (3GPP) context, from the 3GPP Technical Specification 23.888. FIG. 3 illustrates various messages as Machine Type Communications (MTCs). In this example, the reference point shown as MTCu can provide MTC Devices 312 access to a network, such as a 3GPP Bearer Services/SMS/IMS 310, for user traffic. MTC Server 314 can use a reference point ("MTCsms") for MTC Server 314 to connect to a network to use messaging such as SMS. MTC Server 316 can use a reference point designated as MTCi to connect to a network via a bearer service.

In embodiments, messages may be MTC messages including SMS or other types of messages. The types of messages associated with various devices, such as MTC Devices 312 or MTC Server 314, for example, can be aggregated based on type, in some cases. As described, aggregated routing can reduce required resources and improve performance of a network system. The illustration in FIG. 3 relates to a 3GPP standard which can apply in the context of 5G, but other architectures or network environments may benefit from a confirmation, or archive, or trusted message sources.

Messages as used herein can include a tattoo or fingerprint to indicate each message actually occurred, and if the device sending each message is true. Systems can use a tag or tattoo contained in a message, in order to permit the message to gain access to a network for transmission. In other words, a network may determine an exposure of network aspects for use by a device, such as UE 210, to send a message, based on verification of a tag or tattoo in the message, or associated with the message.

An identifier can be a tattoo or watermark, or a silicon identification or "silicon ID," for example. In some cases, an identifier associated with hardware to be stored in the blockchain is known to be accurate. For example, information from a database of known identifiers can be compared to the information in a message in real time, or information form a database can be periodically or routinely accessed and/or downloaded to the system. In some cases, a private, shared data source, such as a third-party ledger, can be accessed or used to obtain identifier information. In embodiments, supply chain information can be accessed to obtain identifier information for one or more components or devices, in order to determine trusted message sources based on identifiers in messages.

In embodiments, an identifier is determined or generated based on information associated with a hardware device. For example, a system can determine or create a identifier, such as a silicon ID, by detecting unique aspects or signatures of hardware devices, such as circuitry or other materials. In some cases, manufacturers or suppliers of hardware devices enable or provide identifiers, such as silicon ID information, using known or proprietary approaches. An identifier of a component can be used as a device identifier, in some cases. A system can store this hardware identifier information for future comparisons to identifiers contained within messages. In some cases, an identifier is associated with a device, such as user equipment 210, which can be a mobile device, a server, or another type of appliance or machine. In some cases, entities such as networks can provide information for determining the accuracy of information within messages, such as timestamp information. For example, various network devices can provide information, wither with a message or separately, to indicate the time a message was sent. In some cases, an approximate time can be used, or an estimate of the sent time can determined by the system and used.

In some cases, an identifier can be based on a description or characterization of hardware aspects of a device, such as user equipment 210. For example, an identifier can be based on RTL information, such as RTL license information. RTL information can describe hardware, such as circuitry or chips or other devices, at a higher level of abstraction than a logic-gate or transistor level. In other words, a description relating to RTL can be less detailed than logic families or logic-gate-level information. RTL data can be used during the logic design phase for integrated circuits, in which case an RTL description may be converted to a gate-level description. An identifier can be based on an RLT value indicating an RLT license, or a plurality of RLT licenses. The licenses can relate to a core, and they can be used or instantiated by one or more components of device attempting to send a message. An identifier can be an identifier related to a motherboard or other component, or to one or more applications identified in connection with a device.

In some embodiments, a tattoo combines an identifier, such as a serial number associated with hardware, with application data, and tags this to a message, such as an SMS message. In some cases, a tattoo may be an RLT stamp, which can act as a watermark or as a unique, or substantially unique, marker. In some cases, a tattoo may be based on a timestamp in combination with an RLT stamp and/or a serial number associated with hardware. For example, the time that a message was sent, meaning attempted to be sent, can be used for a timestamp.

A system can use a tattoo to allow network exposure or access for transmission of a message. In this case, the system can use a tattoo comprising an RLT stamp, for example, to make a determination in near real time. Or another quick stamp or serial number could be used to tag a message for prove a source is legitimate at the time of sending a message. In some cases, the messages sent may need to be regenerated or audited, so archival versions are needed. In these cases, some application data or other information about a device has changed, but other aspects of data can be used to recreate message traffic. A hash could be used in some cases, although it may require more resources or space compared to a rapid stamp such a serial number or RTL, or a combination of a serial number and RTL, for example.

As described herein, if a system knows a hardware device is true, for example based on a tattoo or identifier, and if the timestamp appears aligned considering on processing times, the message can be considered sufficiently trustworthy. In some cases, there is no requirement to digitally sign the data, but in some cases a certificate may be required to impose aspects of the system onto devices. For example, an appliance may require an X509 certificate.

In some cases, messages to be sent can contain or be associated with a tag, such as information to identify a source of the message. For example, a tag can comprise or indicate one or more identifiers of a device sending a message, and, in embodiments, a timestamp associated with the message. The information within or corresponding to a proposed message can be compared to known information in order to approve or complete transmission of the message. In embodiments, a network component such as an NEF 222 or other component(s) may recognize a tag in a message has been found to show a true source of the message. This can be determined prior to a system completing transmission of the message, and it can occur automatically in order to trigger completion of the message transmission.

In embodiments, an endpoint or a recipient of a message can compare a tag in a message, or used to approve a message. For example, a recipient device or network, or an interface or other component, can perform a verification or check of a tag to determine if a message transmission should be completed. In this case, an endpoint device, or an intermediary-recipient device, can compare a tag with identification information and a timestamp to determine if a message should be received or acknowledged. Aspects of a network or a device can compare a tag to one or more data sources or data stores, for example a supply-chain data share of hardware identifiers or downloaded data from such a data share. In real time, a network can use tags to establish trust with a source of a message, in order to send the message.

In embodiments, aspects of a network may determine a tag or tattoo is accurate based on a blockchain block being added that retains the tag or tattoo. For example, a tag can be maintained or go with the added blocks as long as aspects of a message source are not modified. In a ledger 228, a system can analyze and determine where a tag or other information disappeared to see where communications could no longer be trusted. This can also enable re-creating message transmissions and determining at which point trust or a known source was interrupted or compromised. In other embodiments, a tag is determined to be accurate in addition to, but separately from, a block being added to a blockchain for future use, such as auditing or re-generating transmitted messages.

Some examples include a rapid confirmation in order to complete sending of a message, which can be stalled by the system in order for a tag to be analyzed. These rapid determinations can be analyzed or audited later based on information stored, such as in the ledger 228. A system can be configured to rapidly compare aspects of a tag while using a ledger to track information for further review. In some cases, a comparison can be to an expected identifier, which can comprise one or more identifiers, and/or a timestamp, which can be any indication of an approximate or expected time associated with the sending of a communication. In embodiments, a communication can contain or relate to a hash of identifier and/or a timestamp that can be used to approve a message or to archive a message sent, for example in a ledger 228. In other words, verification can involve use of a blockchain or ledger 228, in embodiments. In other embodiments, information within the message is verified to determine the true source of a message, in order to complete transmission of the message, and blockchain may be used for archiving or re-generating messages. This can provide a benefit by improving the ability to re-create machine-to-machine communications in a network that may allow use of virtual Subscriber Identification Modules (SIMs), or embedded SIMs.

In some cases, an origin of a message from a hardware device with data-associated silicate is stored in a ledger 228, which can be a hyper ledger. The message is sent with a tattoo and timestamp data. An endpoint can determine the tattoo and data-associated silicate does not look wrong. If it was ultimately determined to be wrong, the ledger 228 can be used. If the system expects a zero to be returned but receives a value of one in return, the use of the network by a device to send a message can be stalled or prohibited. A ledger 228 can be a distributed ledger, in some cases. Ledger 228 can be shared with (but not altered by) other entities or systems, for purposes of trusting messages.

In embodiments, when a tag or tattoo is added to a message, all of the information is added to a blockchain associated with the message, for example to be stored or used by a ledger 228. For example, a tag or tattoo can be combined with, or include, timestamp and/or RLT information, and this can all be contained in a blockchain that will be stored for future reference in ledger 228. In some cases, any single or combination of markers, such as imprints, birthmarks, or other hardware or software elements can be integrated into a platform for reliable identification of message senders and contained in a hyper ledger data share.

As explained above, technologies relating to supply chains exist that can provide origin data with respect to hardware, such as true silicon. In some cases, this data can be in a distributed private ledger with access based on a need to know or otherwise limited. The tattoos or other markers described herein can be determined or based on unique identifiers associated with hardware devices or components. Embodiments can generate messages, such as SMS messages, with computer-readable tags or stamps of information relating to a time a message was sent and one or more identifiers. When a message is generated, a block of a blockchain stored in ledger 228 can be generated, with information associated with the hardware device and the message itself. In some cases, based on the generating or storing of the block, the message is transmitted to a second device (the recipient device). In some cases, a virtual network slice or instance can provide this service.

As described above, systems can also provide improved technologies relating to route aggregation, which can assemble and prioritize messages based on the domain associated with the messages. For example, SMS messages from an IoT device domain can be aggregated for forwarding or transmitting to a point. Additionally, in embodiments, one or more micro-contract protocols can be used to initiate a code, such as a short code of several digits, when certain parameters are met (such as "if/then" parameters). Embodiments can then send the message when conditions are satisfactory for complete delivery of the message.

Figure 4:
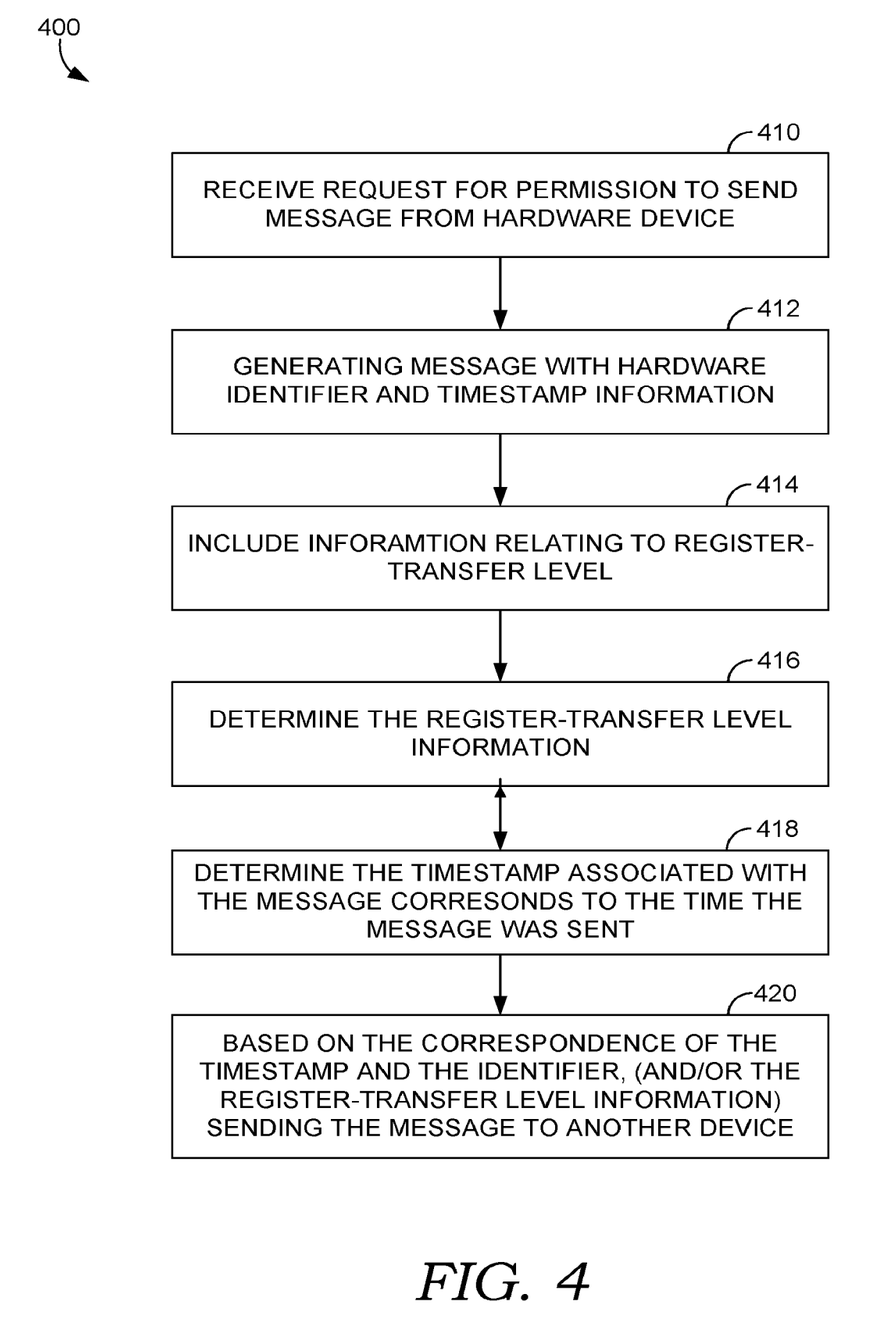
FIG. 4 is an exemplary flow diagram illustrating aspects of embodiments of the present disclosure.

FIG. 4 shows a flow diagram 400 illustrating exemplary aspects of embodiments. As shown at 410, a request can be received for permission to send a message from a first hardware device, such as user equipment 210. At 412, a message is generated with hardware identification information and timestamp information, in embodiments. At 414, information relating to a register-transfer level can be included. As shown at 416, the register-transfer level information can optionally be determined, for example by aspects of a network trying to determine the true identity of the source of the message. For example, aspects discussed with respect to FIG. 2 in a network can analyze RTL information included in a message. As shown at 418, systems can determine if the timestamp associated with the message substantially corresponds to the time the message was sent. At 420, based on the correspondence of the timestamp and/or the hardware identifier (and/or, in some cases, the RTL), a system can send the message to a recipient device.

In embodiments, a tag within a communication, such as an SMS message, includes an identifier such a serial number or another indication of hardware, or trusted silicate, for example based on supply chain data. In some cases, a tag can be based on a combination of an identifier of hardware (which can be a combination of one or more hardware identifiers) and application information. In an example, a tag is based on both a hardware identifier (or indicator) and a timestamp associated with the communication. In some cases, a tag can be based on an identifier and RLT data, such as a stamp. Some embodiments consider two or more elements of the identifying aspects of information discussed above, for example a tag that is a combination of an identifier, a timestamp, and RLT data. Sometimes a message can be stalled or held while a system analyzes the source of a message, or an archived record of messages can be analyzed. In some cases, a verification, or an additional or final check, can use a Minimum Viable Consensus (MVC) to determine an identity of a source of a message, to conserve resources and time, for example. For instance, if three entities of data sources or other components determine a source of a message to be accurate, this level of consensus can be sufficient, in order to allocate the appropriate amount of resources and time in a system.

Figure 5:
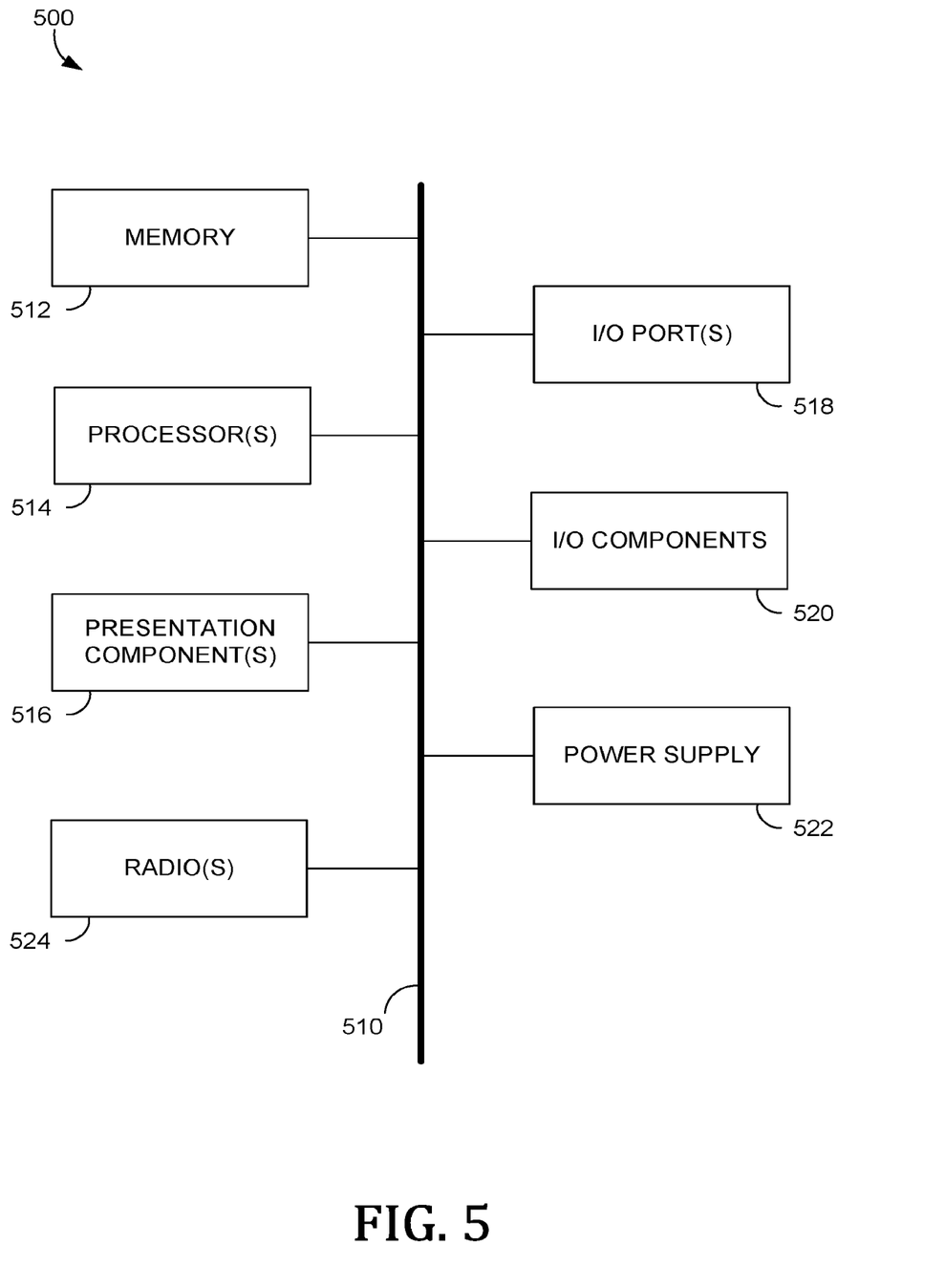
FIG. 5 is an exemplary diagram illustrating aspects for use in accordance with embodiments of the present disclosure.

FIG. 5 illustrates an exemplary operating environment 500 in which embodiments may be implemented. An exemplary operating environment for implementing embodiments of the present invention is shown and designated generally as computing device 510. Computing device 510 is one example of a suitable computing environment. It is not intended to suggest any limits as to the scope of use or functionality of embodiments of the invention. Computing device 510 should not be interpreted as having any dependency or requirement relating to any one or combination of the components illustrated.

Embodiments may be described in the general context of computer code or machine-useable instructions, including computer-executable instructions such as program modules, being executed by a computer or other machine. Generally, program modules including routines, programs, objects, components, data structures, etc. refer to code that perform particular tasks or implement particular abstract data types. Embodiments may be practiced in a variety of system configurations. Embodiments may also be practiced in distributed computing environments where tasks are performed by remote-processing devices that are linked through a communications network.

In FIG. 5, computing device 510 can directly or indirectly coupled to the following devices: memory 512, one or more processors 514, one or more presentation components 516, input/output ports 518, input/output components 520, illustrative power supply 522, and one or more radio aspects or sources 524. The various blocks of FIG. 5 are shown with lines for the sake of conceptual clarity, and other arrangements of the described components and/or component functionality are contemplated. For example, processors have memory. The diagram of FIG. 5 is merely illustrative of an example computing device that can be used in connection with one or more embodiments of the present invention.

Computing device 510 typically includes a variety of computer-readable media. Computer-readable media can be any available media that can be accessed by computing device 510 and includes both volatile and nonvolatile media, removable and non-removable media. By way of example, and not limitation, computer-readable media may comprise computer storage media and communication media. Computer storage media excludes signals per se. Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 110.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 510 includes one or more processors that read data from various entities such as memory 512 or I/O components 520. Presentation component(s) 516 present data indications to a user or other device. Exemplary presentation components include a display device, speaker, printing component, vibrating component, etc. I/O ports 518 allow computing device 510 to be logically coupled to other devices including I/O components 520, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for providing exposure to a network, the method comprising:

receiving a communication to be transmitted from a first device using the network;

determining the communication includes a tag;

determining the tag indicates a silicon identification aspect of the first device and a register transfer level aspect of the first device based on a blockchain storing information about the first device, wherein the register transfer level aspect represents circuitry; and granting use of the network to transmit the communication based on the tag being associated with the first device in the blockchain.

2. The method of claim 1, wherein the first device is an Internet-of-Things device.

3. The method of claim 1, wherein the first device is an autonomous device.

4. The method of claim 2, further comprising:

receiving additional communications to be transmitted from additional Internet-of-Things devices; and aggregating the routing of the additional communications.

5. The method of claim 1, wherein the tag further indicates a time stamp associated with the communication.

6. The method of claim 5, wherein granting use of the network is further based on the time stamp.

7. The method of claim 3, wherein the communication is automatically transmitted to a second device.

8. The method of claim 7, wherein the second device is an autonomous device.

* * * * *